United States Patent
Jackson

(10) Patent No.: US 10,197,454 B2
(45) Date of Patent: Feb. 5, 2019

(54) EXHAUST GAS TEMPERATURE SENSING PROBE ASSEMBLY

(71) Applicant: General Electric Company, Schenectady, NY (US)

(72) Inventor: David Reece Jackson, Binghamton, NY (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 15/281,557

(22) Filed: Sep. 30, 2016

(65) Prior Publication Data

US 2018/0094986 A1 Apr. 5, 2018

(51) Int. Cl.
| | | |
|---|---|---|
| *G01K 7/00* | (2006.01) | |
| *G01K 1/00* | (2006.01) | |
| *G01K 13/00* | (2006.01) | |
| *G01K 3/00* | (2006.01) | |
| *G01K 7/02* | (2006.01) | |
| *G01M 15/14* | (2006.01) | |
| *G01K 1/08* | (2006.01) | |
| *G01K 13/02* | (2006.01) | |

(52) U.S. Cl.
CPC .............. *G01K 7/02* (2013.01); *G01K 1/08* (2013.01); *G01K 13/02* (2013.01); *G01M 15/14* (2013.01); *G01K 2013/024* (2013.01)

(58) Field of Classification Search
USPC ....... 374/148, 110, 116, 138, 144, 208, 166, 374/179
See application file for complete search history.

(56) References Cited

U.S. PATENT DOCUMENTS

| | | | | |
|---|---|---|---|---|
| 2,496,806 | A | | 2/1950 | Moffatt |
| 2,930,827 | A | * | 3/1960 | Schunke ............... G01K 13/02 136/224 |
| 3,007,990 | A | | 11/1961 | Ihnat |
| 3,451,268 | A | | 6/1969 | Meador |
| 4,162,929 | A | * | 7/1979 | Finney .................... G01K 1/14 136/230 |
| 4,467,134 | A | * | 8/1984 | Pustell ................... G01K 13/02 136/230 |
| 4,499,330 | A | | 2/1985 | Pustell |
| 5,427,452 | A | * | 6/1995 | Stuart ..................... G01K 7/04 136/230 |

(Continued)

FOREIGN PATENT DOCUMENTS

EP 2 607 871 A2 6/2013

OTHER PUBLICATIONS

Extended European Search Report and Opinion issued in connection with corresponding EP Application No. 17193183.5 dated Jan. 31, 2018.

(Continued)

*Primary Examiner* — Mirellys Jagan
(74) *Attorney, Agent, or Firm* — General Electric Company; William Scott Andes

(57) ABSTRACT

A temperature sensing assembly includes a temperature sensing probe having a tip and a thermocouple junction located near the tip and a housing positioned around at least a portion of the temperature sensing probe and having an inlet opening between the thermocouple junction and an attachment point, and having a set of exhaust openings.

17 Claims, 8 Drawing Sheets

(56) References Cited

U.S. PATENT DOCUMENTS

| | | | | |
|---|---|---|---|---|
| 5,812,588 | A | * | 9/1998 | Deak ........................ G01K 1/12 |
| | | | | 136/230 |
| 6,076,963 | A | * | 6/2000 | Menzies ................ G01K 13/02 |
| | | | | 374/135 |
| 6,543,934 | B1 | * | 4/2003 | Hammer .................. G01K 1/18 |
| | | | | 136/230 |
| 7,467,891 | B2 | * | 12/2008 | Gennissen ............. G01K 13/02 |
| | | | | 374/141 |
| 9,476,776 | B2 | | 10/2016 | Kim et al. |
| D803,706 | S | | 11/2017 | Jackson |
| 2008/0317092 | A1 | * | 12/2008 | Bard ........................ G01K 3/06 |
| | | | | 374/115 |
| 2013/0167554 | A1 | * | 7/2013 | Parsons .................... G01K 1/12 |
| | | | | 60/803 |
| 2018/0094534 | A1 | | 4/2018 | Jackson |
| 2018/0094989 | A1 | | 4/2018 | Jackson |

OTHER PUBLICATIONS

Notice of Allowance towards related U.S. Appl. No. 29/579,453, dated Aug. 7, 2017.
U.S. Appl. No. 29/579,453, filed Sep. 23, 2016, Jackson.
U.S. Appl. No. 15/281,585, filed Sep. 30, 2016, Jackson.
U.S. Appl. No. 15/281,612, filed Sep. 23, 2016, Jackson.

\* cited by examiner

EXHAUST GAS TEMPERATURE SENSING PROBE ASSEMBLY

BACKGROUND OF THE INVENTION

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

During operation of the gas turbine engines, fuel is combusted to provide rotational energy and thrust through a set of turbines. In order to ensure or validate the gas turbine engine is operating as desired, a temperature sensor probe can be included in the engine wherein it is exposed to the exhaust gases. The temperature sensor can measure the temperature of the exhaust gas stream, and can provide a signal or measurement value to another system, such as an engine control system. The temperature sensor output can be used to, for example, protect the downstream engine components from temperatures that would exceed their design capabilities.

BRIEF DESCRIPTION OF THE INVENTION

In one aspect, the present disclosure relates to a temperature sensing probe assembly including a temperature sensing probe having a tip and a first thermocouple junction located nearer the tip and a second thermocouple junction located nearer an attachment point for the temperature sensing probe assembly, and a housing positioned around at least a portion of the temperature sensing probe and having a lengthened inlet opening that extends from at least a portion of the first thermocouple junction to at least a portion of the second thermocouple junction and having a set of exhaust openings. The tip extends beyond the housing and a stream of air flows through the housing from the lengthened inlet opening to the set of exhaust openings to establish a flow path through the housing.

In another aspect, the present disclosure relates to an exhaust gas temperature sensing probe assembly for use in an aircraft engine, including a temperature sensing probe having a tip and a first thermocouple junction located nearer the tip and a second thermocouple junction located nearer an attachment point for the temperature sensing probe assembly, and a housing positioned around at least a portion of the temperature sensing probe and configured to operably couple to a turbine case within the engine and where the housing has a set of inlet openings that extend from at least a portion of the first thermocouple junction to at least a portion of the second thermocouple junction and having a set of exhaust openings. A stream of heated air flows through the housing from the set of inlet openings to the set of exhaust openings to establish a flow path through the housing, and the case has a cooler temperature than the stream of heated air and wherein the configuration of the set of inlet openings and the set of exhaust openings shifts a thermal gradient away from the second thermocouple junction.

In yet another aspect, the present disclosure relates to a temperature sensing probe assembly, including a temperature sensing probe having a tip and a first thermocouple junction located nearer the tip and a second thermocouple junction located nearer an attachment point for the temperature sensing probe assembly, and a housing positioned around at least a portion of the temperature sensing probe and having a lengthened inlet opening that extends from near the tip to a location between the second thermocouple junction and the attachment point, and having a set of exhaust openings. A stream of air flows through the housing from the lengthened inlet opening to the set of exhaust openings to establish a flow path through the housing.

DESCRIPTION OF EMBODIMENTS OF THE INVENTION

Figure 1:
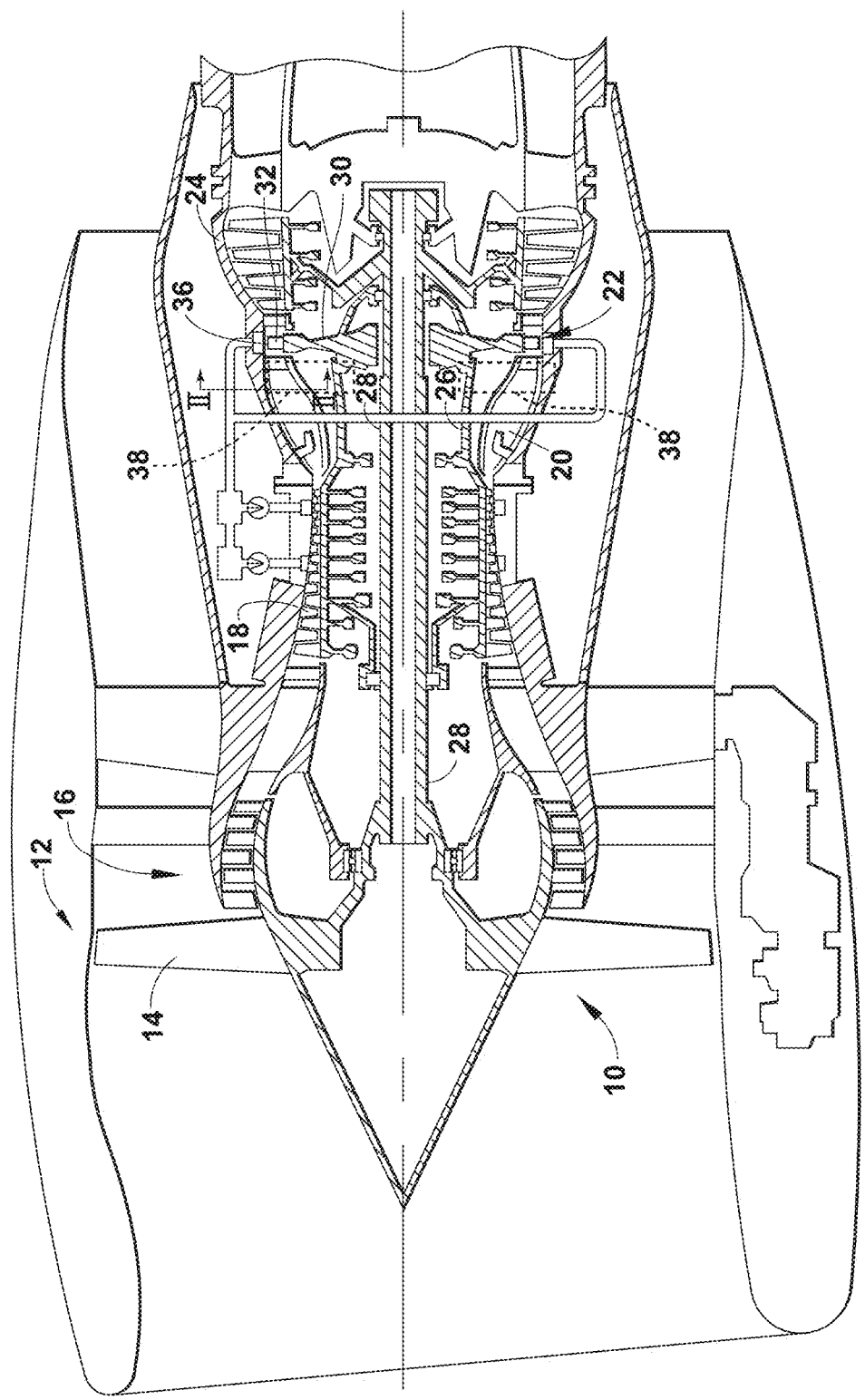
FIG. 1 illustrates a cross-sectional view of a gas turbine engine in accordance with various aspects described herein.

Aspects of the disclosure can be implemented in any temperature sensing application, environment, apparatus, or method for sensing a temperature regardless of the function performed by the temperature sensing, or operable output, outcome, or function of the temperature sensing. While aspects of the disclosure are described with regard to a gas turbine engine for an aircraft, it will be understood that the aspects of the disclosure are not so limited and have general application in non-aircraft applications, such as other mobile applications and non-mobile industrial, commercial, and residential applications.

While "a set of" various elements will be described, it will be understood that "a set" can include any number of the respective elements, including only one element. As used herein, the terms "axial" or "axially" refer to a dimension along a longitudinal axis of a described component. Also as used herein, the terms "radial" or "radially" refer to a dimension extending between a center longitudinal axis, an outer circumference, or a circular or annular component disposed relative to the axis. "Sensing" or "measuring" the temperature as described herein can include determining a value indicative of, or related to, the temperature, rather than directly sensing or measuring the temperature itself. The sensed or measured values can be provided to additional components. For instance, the value can be provided to a controller, and the controller can perform processing on the value to determine a temperature or an electrical characteristic representative of said temperature.

Also used herein, a "thermocouple" or a "thermocouple junction" is a temperature sensing apparatus including one or more junctions of two dissimilar metals that produce an electrical potential representative of, or related to, a measure of the temperature or the medium to which the junctions are exposed. In one aspect of the disclosure, the junction or junctions can be mounted in a casing or housing, and can, in combination, form a "thermocouple probe." One non-limiting example of a thermocouple construction can be found in U.S. Pat. No. 3,007,990.

All directional references (e.g., radial, axial, upper, lower, upward, downward, left, right, lateral, front, back, top, bottom, above, below, vertical, horizontal, clockwise, counterclockwise, fore, aft) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 includes, in downstream serial flow relationship, a fan section 12 including a fan 14, a booster or low pressure (LP) compressor 16, a high pressure (HP) compressor 18, a combustion section 20, a HP turbine 22, and a LP turbine 24. A HP shaft or spool 26 drivingly connects HP turbine 22 to HP compressor 18 and a LP shaft or spool 28 drivingly connects LP turbine 24 to LP compressor 16 and fan 14. HP turbine 22 includes an HP turbine rotor 30 having turbine blades 32 mounted at a periphery of rotor 30. Blades 32 extend radially outwardly from blade platforms 34 to radially outer blade tips 36. The gas turbine engine 10 can further include a temperature sensing probe assembly 38, illustrated in schematic outline, and positioned proximate to the aft of the engine 10, that is, downstream from the fan section 14. In one non-limiting example configuration, the temperature sensing probe assembly 38 can be positioned serially downstream from the combustion section 20 and upstream of at least one of the HP turbine 22 or LP turbine 24. In another non-limiting example configuration, the gas turbine engine 10 can include a set of temperature sensing probe assemblies 38 arranged about the engine 10, for instance, spaced about a circumference of the engine 10.

The gas turbine engine 10 can operate such that the rotation of the fan 14 draws air into the HP compressor 18. The HP compressor 18 compresses the air and delivers the compressed air to the combustion section 20. In the combustion section 20, the compressed air can be mixed with fuel, and the air/fuel mixture is ignited, expanding and generating high temperature exhaust gases. The engine exhaust gases, traverse downstream, passing the set of temperature sensing probe assemblies 38, and through the HP and LP turbines 22, 24, generating the mechanical force for driving the respective HP and LP spools 26, 28. Finally, the exhaust gases, can be expelled from the rear of the engine 10.

Figure 2:
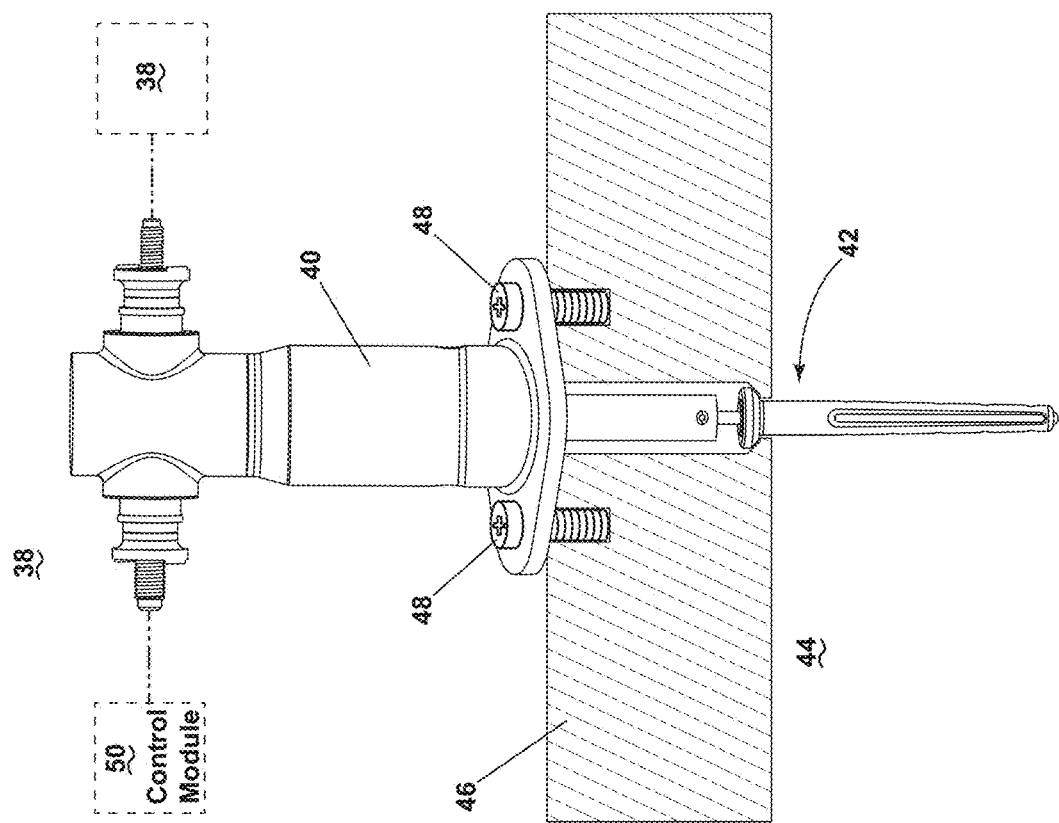
FIG. 2 illustrates a perspective view of a temperature sensing probe assembly for the gas turbine engine of FIG. 1, in accordance with various aspects described herein.

FIG. 2. illustrates a non-limiting perspective view of the temperature sensing probe assembly 38 of FIG. 1. As shown, the temperature sensing probe assembly 38 can include a first portion 40 and a second portion 42. Non-limiting aspects of the temperature sensing probe assembly 38 can be included wherein the first portion 40 is disposed outside of, or external to, an exhaust gas passage 44, while the second portion 42 is disposed within, or exposed to, the exhaust gas passage 44. In the illustrated example, the exhaust gas passage 44 can be at least partially defined by a gas turbine engine wall 46. Non-limiting configurations of the engine wall 46 can include an interior engine wall, an exterior engine wall, a low pressure turbine case, a turbine case wall, or the like. Non-limiting configurations of the temperature sensing assembly 38 can be included wherein at least one of the assembly 38, the first portion 40, or the second portion 42 can be supported by, coupled with, or fixed to the engine wall 46 by a mechanical fastener, such as a set of screws 48, or the like. While a single continuous engine wall 46 is illustrated, the wall 46 can include a set of independent walls, including but not limited to a low pressure turbine case or the like.

Non-limiting aspects of the temperature sensing probe assembly 38 can be communicatively coupled with another temperature sensing probe assembly 38 or a controller module 50. The controller module 50 can be configured to receive a sensed or measured temperature, or a value representative or indicative thereof, from the temperature sensing probe assembly 38, and perform additional or separate functionality based upon the temperature. In a non-limiting configuration of the disclosure, the controller module 50 can summate, average, or merge temperatures or values received from or provided by a set of temperature sensing probe assemblies 38.

Figure 3:
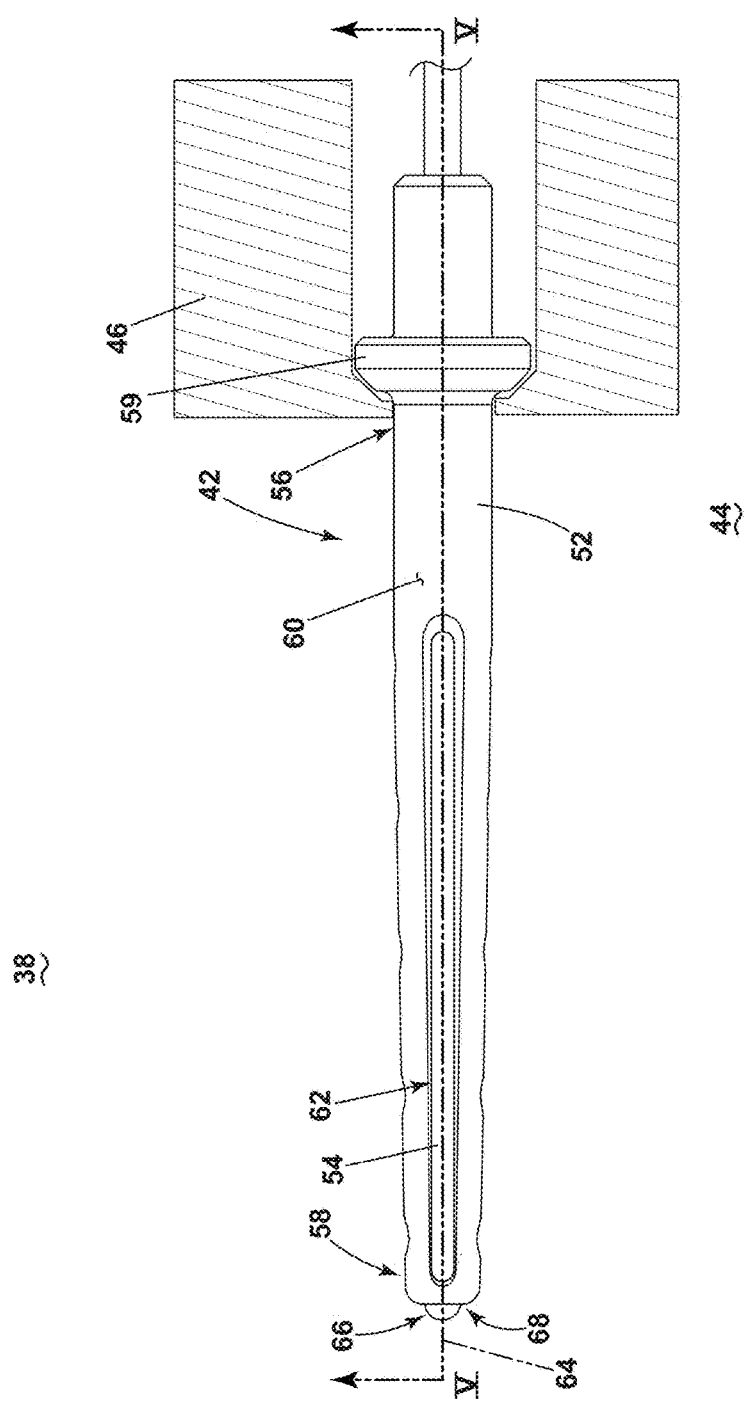
FIG. 3 illustrates another perspective view of the temperature sensing probe assembly of FIG. 2, in accordance with various aspects described herein.

FIG. 3 illustrates a zoomed perspective view of the second portion 42 of the temperature sensing probe assembly 38 and is in the perspective of the substantial direction of movement of the exhaust gases during gas turbine engine operation. The temperature sensing probe assembly 38 can include a temperature sensing probe 54 and a housing 52 positioned around at least a portion of the temperature sensing probe 54. In one non-limiting aspect of the disclosure, the temperature sensing probe assembly 38, the housing 52, and the temperature sensing probe 54 can define a common longitudinal axis 64.

The housing 52 can include a first end 56 located proximate to the engine wall 46, and a spaced second end 58. The first end 56 can include an attachment point for positioning the temperature sensing probe assembly 38 relative to the engine wall 46. In one non-limiting configuration, the attachment point can include a shoulder 59. In a non-limiting configuration, the housing 52 can include an outer surface 60 having a generally conical construction wherein the first end 56 includes a first outer diameter and the second end 58 having a second outer diameter smaller than the first diameter. In this non-limiting configuration, the generally conical construction of the outer surface 60 can linearly transition from the first outer diameter to the second outer diameter. Regardless of the configuration of the housing 52 or outer surface 60, non-limiting aspects of the housing 52 can include an interior sized to receive the temperature sensing probe 54, such as having a substantially cylindrical shape, for example. In one non-limiting configuration, the housing 52 can include a metal-alloy material, or another material configured or selected for strength. The housing 52 material strength, the shape, the contours, the geometry, or the like can be selected or manufactured to counter vibrations or deformation, such as deformation over time in the high temperature environment of the exhaust gas passage 44. In another non-limiting example, the housing 52 can be selected or manufactured to reduce stress due to induced cyclic loading, aerodynamic loading, or the like. In one example, the exhaust gas passage 44 can be exposed to temperatures greater than 1100 degrees Celsius.

The housing 52 can also include at least one lengthened inlet opening 62 disposed to receive at least a portion of air or exhaust gases traversing the exhaust gas passage 44. As used herein, the portion of the housing 52 having the inlet opening 62 will be referred to as the "fore" side of the housing 52, with the opposite side of the housing being the "aft" side of the housing 52. In one non-limiting example, the inlet opening 62 can include a continuous opening extending along the longitudinal axis 64 of the housing 52 such that a lengthened portion of the underlying temperature sensing probe 54 corresponding to the inlet opening 62 is directly exposed to the exhaust gases traversing the exhaust gas passage 44. In another non-limiting example, the inlet opening 62 can include a set of inlet openings 62 extending along respective portions of the longitudinal axis 64 of the housing 52 such that related portions of the underlying temperature sensing probe 54 corresponding to the set of inlet openings 62 are directly exposed to the exhaust gases traversing the exhaust gas passage 44. In one non-limiting configuration, the inlet opening 62 can include a substantially ovate opening having a length of 0.003175 meters, a width of 0.0000762 meters, and a cross-sectional area of 0.0000761 square meters. Additional geometric configurations of the inlet opening 62 and area configurations can be included.

The temperature sensing probe 54 can extend through the interior of the housing 52 and include a tip 66 located proximate to the second end 58. In one non-limiting configuration of the temperature sensing probe assembly 38, temperature sensing probe 54, or housing 52, the temperature sensing probe 54 can be disposed or configured such that the tip 66 extends beyond the housing 52 opposite the engine wall 46. In one example configuration, the tip 66 can extend beyond the housing 52 through an aperture 68 concentric to the longitudinal axis 64 of the housing 52.

Figure 4:
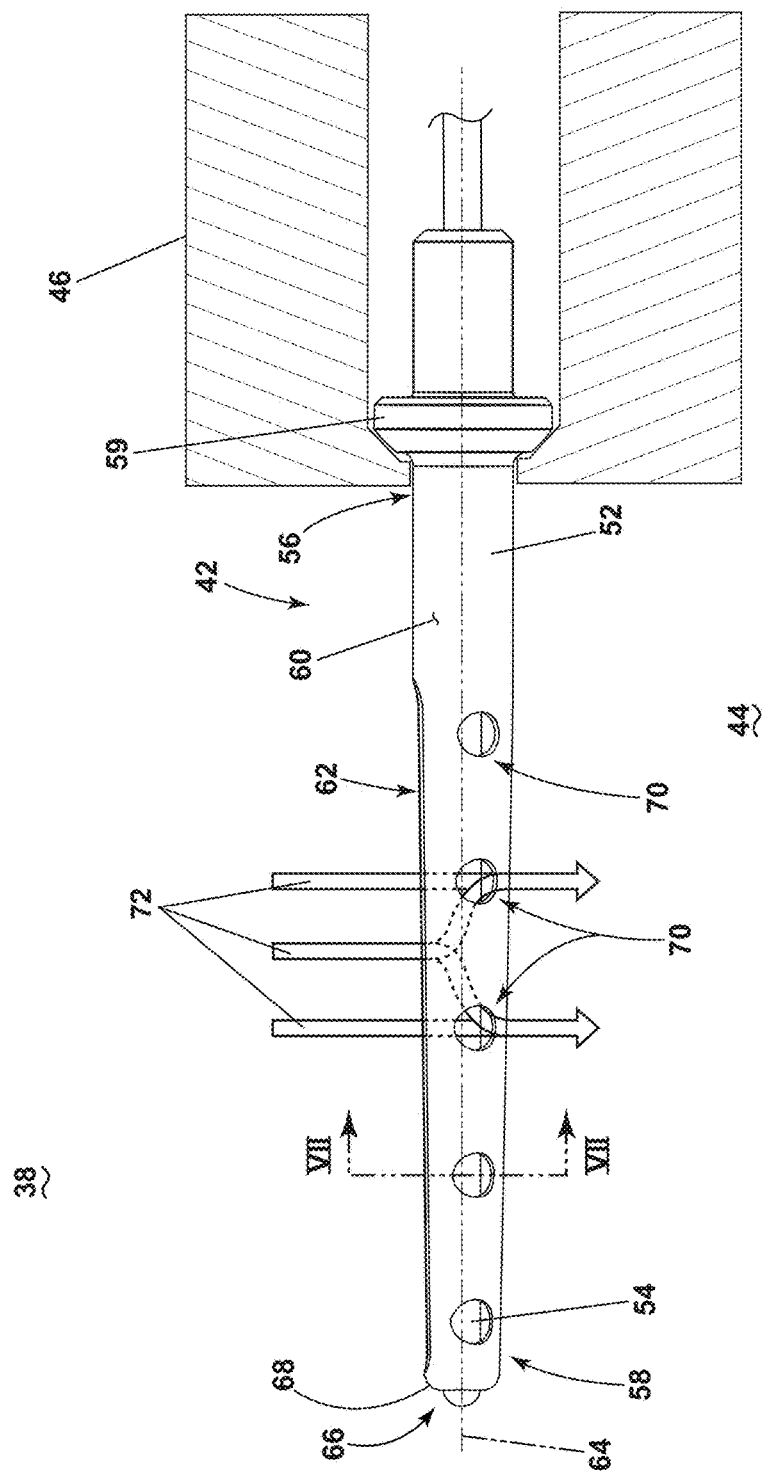
FIG. 4 illustrates another perspective view of the temperature sensing probe assembly of FIG. 2, normal to the view illustrated in FIG. 3, in accordance with various aspects described herein.

FIG. 4 illustrates another non-limiting perspective view of the temperature sensing probe assembly 38 from a perspective view taken along line IV-IV of FIG. 3. As shown, the aft side of the housing 52 can further include a set of fluid passages or exhaust openings 70 spaced along the longitudinal axis 64. In one non-limiting aspect of the disclosure, the set of exhaust openings 70 are spaced along a portion of the longitudinal axis 64 corresponding with, or related to, the lengthened inlet opening 62. Taken together, the inlet opening 62 and the set of exhaust openings 70 define a housing flow path wherein a stream of air or exhaust gases (illustrated by arrows 72) received by the inlet opening 62 flows through the housing 52 to the set of exhaust opening 70. In this sense, the at least a portion of the temperature sensor probe 54 can be exposed to the exhaust gas flow 72 via the inlet opening 62 and the set of exhaust openings 70. In one non-limiting configuration of the housing 52, the number of the set of exhaust openings 70 can be larger than the number of the set of inlet openings 62. In another non-limiting configuration, the set of exhaust openings 70 can be configured to reduce stress, vibration, deformation, induced cyclic loading, aerodynamic loading, or the like, on the housing 52.

Non-limiting aspects of the disclosure can be included wherein the set of exhaust opening 70 are equally spaced along the longitudinal axis 64. Additionally, while the perspective view of FIG. 4 illustrates one set of exhaust openings 70 along the longitudinal axis 64, non-limiting aspects of the housing 52 can be included wherein a corresponding second set of exhaust openings 70 can be configured, disposed, mirrored or located on the opposing side of the housing 52, as well. In one non-limiting configuration, the exhaust openings 70 can be substantially circular in shape, and can include a cross-sectional area of 0.00007935 square meters. Additional geometric configurations of the set of exhaust openings 70 and area configurations can be included. Additional non-limiting configurations can be included wherein the cross-sectional area of the inlet opening 62 can be approximately equal to, or substantially the same as the combined or summated cross-sectional areas of the set of exhaust openings 70.

Figure 5:
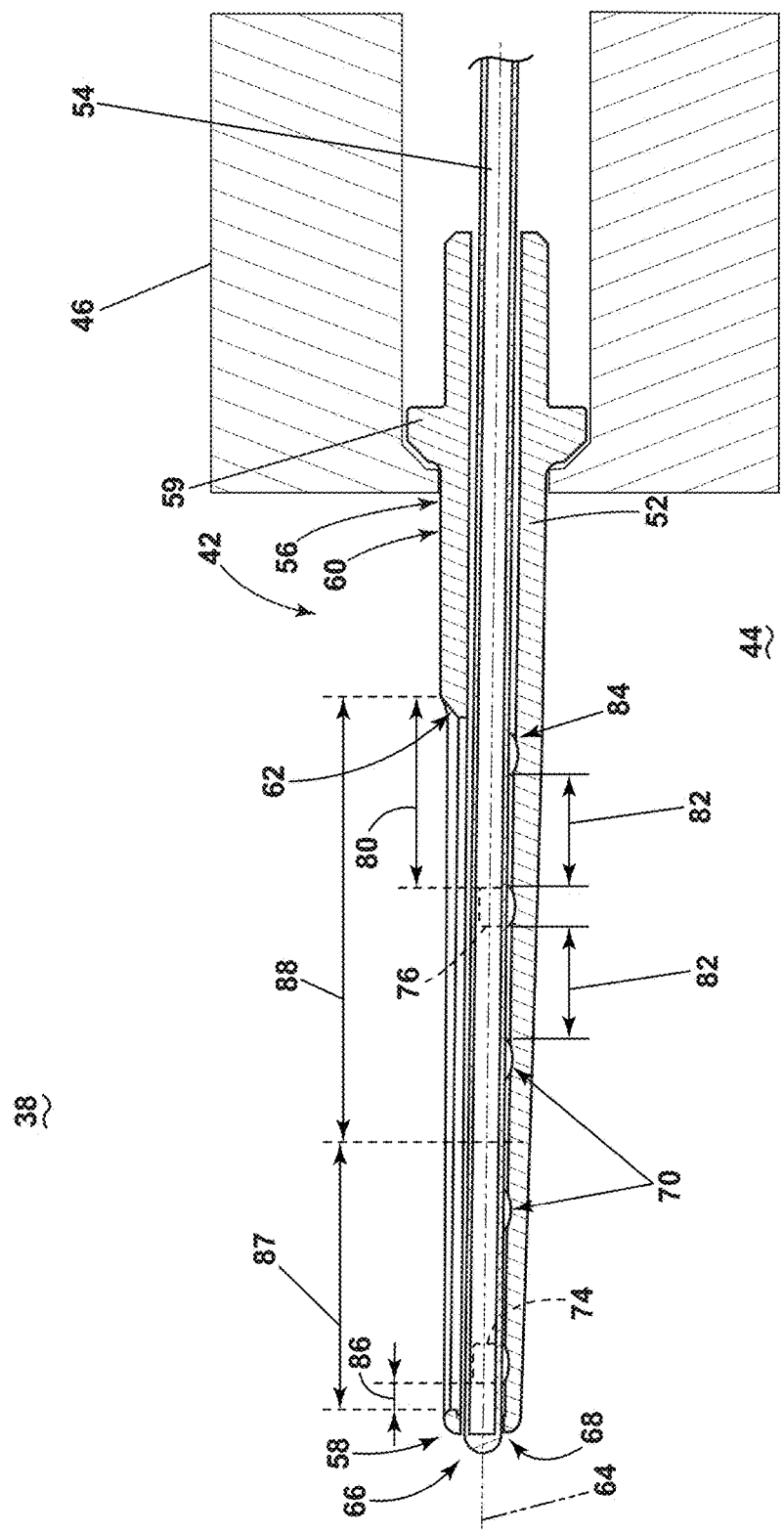
FIG. 5 illustrates a cross-sectional view of the temperature sensing probe assembly taken along line V-V of FIG. 3, in accordance with various aspects described herein.

FIG. 5 illustrates a cross-sectional view of the temperature sensing probe assembly 38 taken along line V-V of FIG. 3. As shown, the temperature sensing probe 54 can include a first temperature sensor, such as a first thermocouple junction 74 located proximate to or nearer to the tip 66 or the second end 58 of the housing 52, and a second temperature sensor, such as a second thermocouple junction 76 located proximate to or nearer to the first end 56 or engine wall 46, relative to the first thermocouple junction 74. In one non-limiting aspect of the disclosure, the first thermocouple junction 74 can be disposed or located such that it resides at approximately 35% of the low pressure turbine span radius, when included in the gas turbine engine. As used herein, the "low pressure turbine span radius" can include the span measured from the low pressure turbine hub to the radially spaced case or wall (e.g. the low pressure turbine case wall). In another aspect of the disclosure, the "low pressure turbine span radius" can include the radial span of the exhaust gas flowpath. In another non-limiting aspect of the disclosure, the second thermocouple junction 76 can be disposed or located such that it resides at approximately 65% of the low-pressure turbine span radius, when included in the gas turbine engine. In yet another non-limiting aspect of the disclosure, the first thermocouple junction 74 can be disposed or located such that it resides at approximately 35% of the length of the temperature sensing probe assembly 38 inside the exhaust gas passage 44, measured from the tip 66. In another non-limiting aspect of the disclosure, the second thermocouple junction 76 can be disposed or located such that it resides at approximately 65% of the length of the temperature sensing probe assembly 38 inside the exhaust gas passage 44, measured from the tip 66.

The first or second thermocouple junction 74, 76, or a combination thereof, can be configured to operably sense the temperature of airflow communicating with the temperature sensor probe 54 proximate to the respective junction 74, 76. The first or second thermocouple junctions 74, 76 can be further communicatively coupled with, for example, a controller module, such as the controller module 50 of FIG. 2, wherein the temperature sensed by at least one of the first or second thermocouple junctions 74, 76 can be reviewed, processed, analyzed, averaged, balanced, or otherwise determined. Aspects of the disclosure can include configurations wherein the temperature sensing probe assembly 38 includes a controller module configured to perform at least a subset of processing, sensing, or determining operations, and further configured to provide the output of such operations to another controller module remote from the temperature sensing probe assembly 38.

In one aspect of the disclosure, the inlet opening 62 of the housing 52 extends from at least a portion of the first thermocouple junction 74 to at least a portion of the second thermocouple junction 76. In another aspect of the disclosure, the inlet opening 62 of the housing 52 extends beyond the second thermocouple junction 76 towards the first end 56 or the shoulder 59 of the housing 52. In another non-limiting configuration, the inlet opening 62 of the housing 52 extends beyond the first thermocouple junction 74 toward the tip 66 or the second end 58 of the housing 52.

In one non-limiting configuration, the second thermocouple junction 76 can be spaced from the terminal end of the inlet opening 62, proximate to the first end 56, by a first distance 80. In another non-limiting configuration, the first thermocouple junction 74 can be spaced from the terminal end of the inlet opening 62, proximate to the second end 58, by a second distance 86. As shown, the first distance 80 can be greater than a third distance 82 separating adjacent exhaust openings 70. Similarly, the second distance 86 can be less than the third distance 82 separating adjacent exhaust openings 70.

The set of exhaust openings 70 can be disposed, located, or configured to ensure or enable a predetermined or known amount of airflow through the temperature sensing probe assembly 38. The predetermined or known amount of airflow enabled can be selected to ensure or enable an accurate temperature sensing of the exhaust gases by at least one of the temperature sensing probe 54, the first thermocouple junction 74, the second thermocouple junction 76, or a combination thereof. For example, in one non-limiting aspect of the disclosure, a first exhaust opening 84 can be located, disposed, positioned, configured, or the like, between the second thermocouple junction 76 and the first end 56, the shoulder 59, or the terminal end of the inlet opening 62 proximate to the first end 56.

Aspects of the disclosure can be included wherein at least a portion of the engine wall 46 can have a cooler temperature than the exhaust gases of the exhaust gas passage 44. This can be due to, for example, a thermally conductive path from the engine wall 46 to another, cooler portion of the engine, casing, pylon, aircraft, or environmental exposure outside of the engine. Regardless of the specific thermally conductive path of the engine wall 46, the removal of heat from the wall 46 can further remove heat from a portion of at least one of the housing 52 or temperature sensing probe 54 proximate to the engine wall 46. The removal of heat from the at least one of the housing 52 or temperature sensing probe 54, by the cooler engine wall 46, can operably skew, distort, or otherwise affect the accuracy of temperature-sensing capabilities of at least one of the first or second thermocouple junctions 74, 76. Stated another way, the removal of heat via the engine wall 46 can create a thermal gradient in the temperature sensing probe assembly 38 causing the sensed temperature or temperature reading to be lower than the "true" airflow or exhaust gas temperature.

Non-limiting aspects of the disclosure can be included such that the configuration of the inlet opening(s) 62, the set of exhaust openings 70, or a combination thereof, are arranged to shift, adjust, or the like, a thermal gradient of the temperature sensing probe 54, the first thermocouple junction 74, the second thermocouple junction 76, the housing 52, or a combination thereof, away from the engine wall 46 or first end 56 of the housing 52. Stated another way, the configuration of the temperature sensing probe assembly 38 is arranged such that the cooler temperature of the engine wall 46 does not affect, or has less of an effect on the accuracy of the temperature-sensing capabilities of the temperature sensing probe 54 or probe assembly 38.

In one non-limiting example configuration, the second thermocouple junction 76 can be surrounded by more housing 52 mass or volume, compared with the first thermocouple junction 74 (e.g. due to the conical shape of the housing 52). In this example, the second thermocouple junction 76 can take a longer period of time to respond to temperature changes, or can take a take a longer period of time to sense an a temperature change, when compared with the first thermocouple junction 74 (i.e. a "time lag"). This phenomena can be countered or mitigated by arranging, disposing, or configuring the temperature sensing probe assembly 38 such that a greater or increased amount, a greater percentage, or a greater ratio of airflow received by the housing 52 is relatively directed to the second thermocouple junction 76, compared with the first thermocouple junction 74.

For instance, in one non-limiting configuration, approximately one third of total airflow received by the inlet opening 62 can be received by a lower portion 87 of the inlet opening 62, while the remaining two thirds of total airflow (e.g. twice the amount of airflow received by the lower portion 87) can be received by an upper portion 88 of the inlet opening 62. In this sense, the lower portion 87 can be arranged or configured to at least partially deliver the airflow to the first thermocouple junction 74 while the upper portion 88 can be arranged or configured to at least partially deliver the airflow to the second thermocouple junction 76, such that the first and second thermocouple junctions 74, 76 have approximately or substantially the same or equal sensing or response time. Stated another way, the configuration can be arranged or selected, as stated, to reduce or decrease a time lag between the first and second thermocouple junctions 74, 76.

The positioning of the second thermocouple junction 76 away from the portion of the inlet opening 62 closest to the first end 56 or shoulder 59 of the housing 52 by the first distance 80, and consequently further away from the thermal gradient of the temperature sensing probe assembly 38 or engine wall 46, enables the second thermocouple junction 76 to read, sense, or measure are more accurate temperature of the airflow or exhaust gas. This configuration is further enhanced by locating or disposing the first exhaust opening 84 between the second thermocouple junction 76 and the terminal end of the inlet opening 62 proximate to the first end 56 of housing 52, such that airflow received proximate to the terminal end of the inlet opening 62 will impinge on the temperature sensing probe 54 and will be exhausted out of the housing by the first exhaust opening 84 away from the second thermocouple junction 76. By directing the received airflow proximate to the engine wall 46 away from the second thermocouple junction 76, the thermal gradient due to the engine wall 46 is kept away, or is less effective at affecting the accuracy of the temperature measurements captured by the second thermocouple junction 76.

Figure 6:
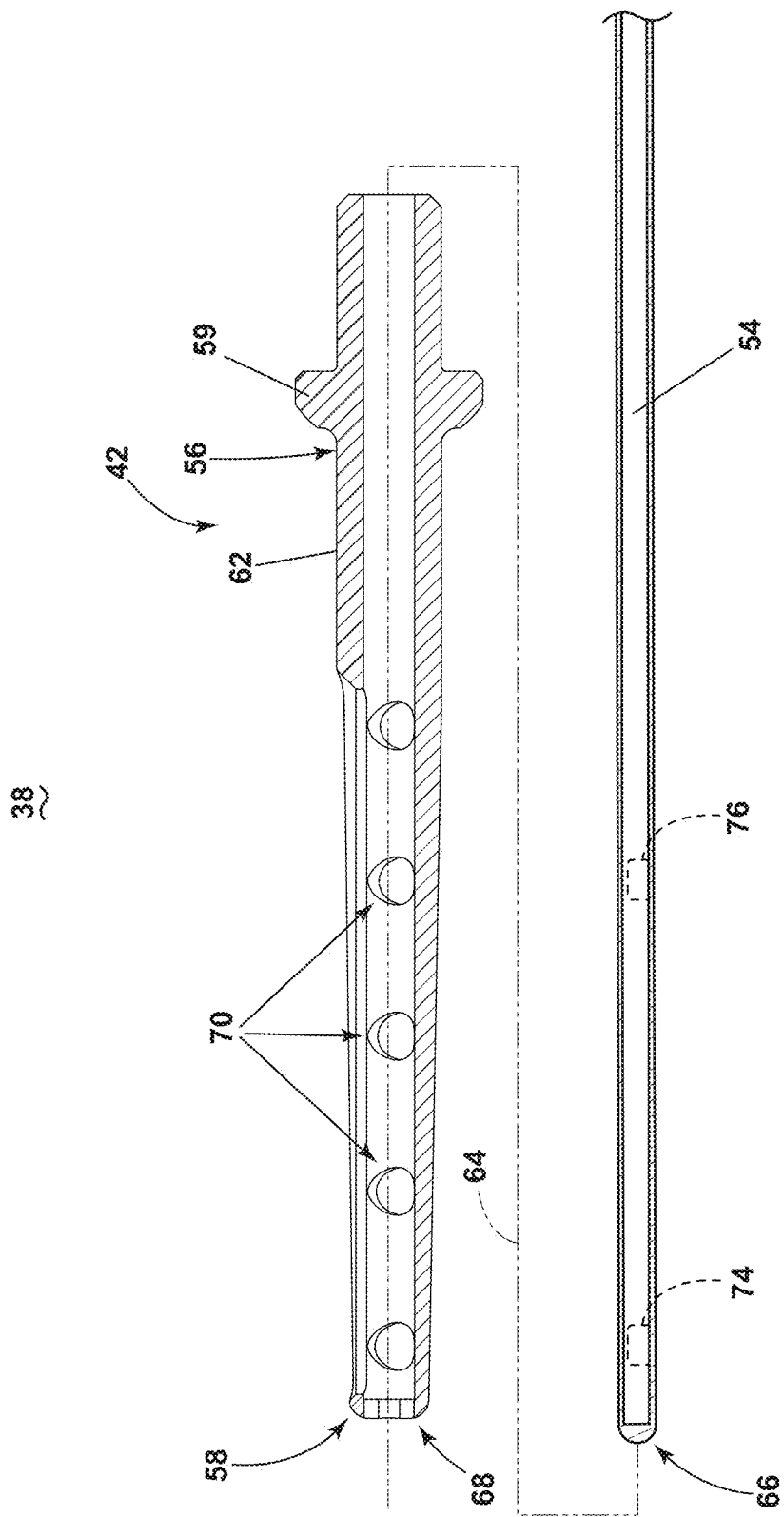
FIG. 6 illustrates an axially exploded cross-sectional view of the temperature sensing probe assembly of FIG. 5, in accordance with various aspects described herein.

FIG. 6 illustrates an axially-exploded cross-sectional view of the temperature sensing probe assembly 38, wherein the temperature sensing probe 54 is moved from the housing 52 along the longitudinal axis 64. The view of FIG. 6 illustrates the set of exhaust openings 70 on the aft of the housing 52, relative to the perspective view of FIGS. 4 and 5.

Figure 7:
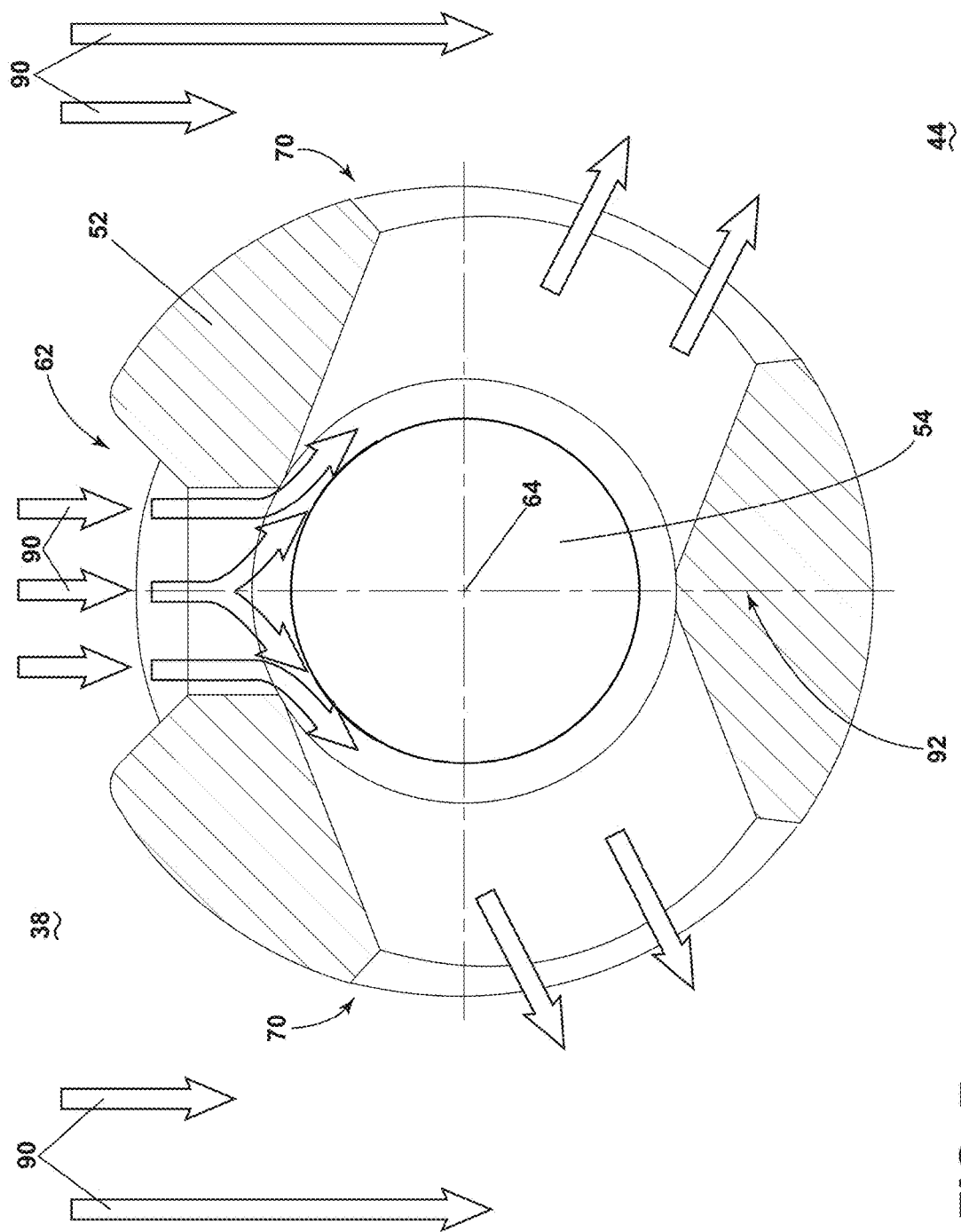
FIG. 7 illustrates a cross-sectional view of the temperature sensing probe assembly taken along line VII-VII of FIG. 4, in accordance with various aspects described herein.

FIG. 7 illustrates a cross-sectional view of the temperature sensing probe assembly 38 taken along line VII-VII of FIG. 4 illustrating the matching sets of exhaust openings 70 on the sides of the housing 52. As shown, the sets of exhaust openings 70 can be radially offset from the axis 92 of the inlet opening 62, or radially offset from the longitudinal axis 64, compared with the inlet opening 62. In one non-limiting configuration, the sets of exhaust openings 70 can be equally radially offset on both sides of the axis 92 of the inlet opening 62 or the longitudinal axis 64. In one non-limiting configuration, the set of exhaust openings 70 can be radially offset from the inlet opening 62 by approximately 120 degrees. While only a single cross-sectional view of mirrored, matching, or paired exhaust openings 70 is illustrated, aspects of the disclosure can be included wherein additional exhaust openings 70 are mirrored, matched, or paired along the length of the longitudinal axis 64.

As shown, a portion of an airflow (illustrated as arrows 90), such as a heated, a combusted, or an exhaust flow or stream can be received by the inlet opening 62 of the housing 52. The inlet opening 62 or the temperature sensing probe assembly 38 can be positioned, disposed, or the like, such that the inlet opening 62 is arranged essentially along a flow axis of the airflow 90 or stream of air to be sensed for temperature. The airflow 90, once received by the inlet opening 62, is directed toward the center of the temperature sensing assembly 38, such as toward the longitudinal axis 64, wherein it is in fluid communication with the temperature sensing probe 54. In one non-limiting aspect of the disclosure, the airflow 90 is allow to impinge on the temperature sensor probe 54. The impingement on the temperature sensor probe 54 can be provided along the length of the inlet opening 62, proximate to the first thermocouple junction 74, proximate to the second thermocouple junction 76, or a combination or subset thereof. The airflow 90 is then directed about or around the temperature sensor probe 54, wherein it is vented or exhausted through at least one of the radially offset exhaust openings 70.

Figure 8:
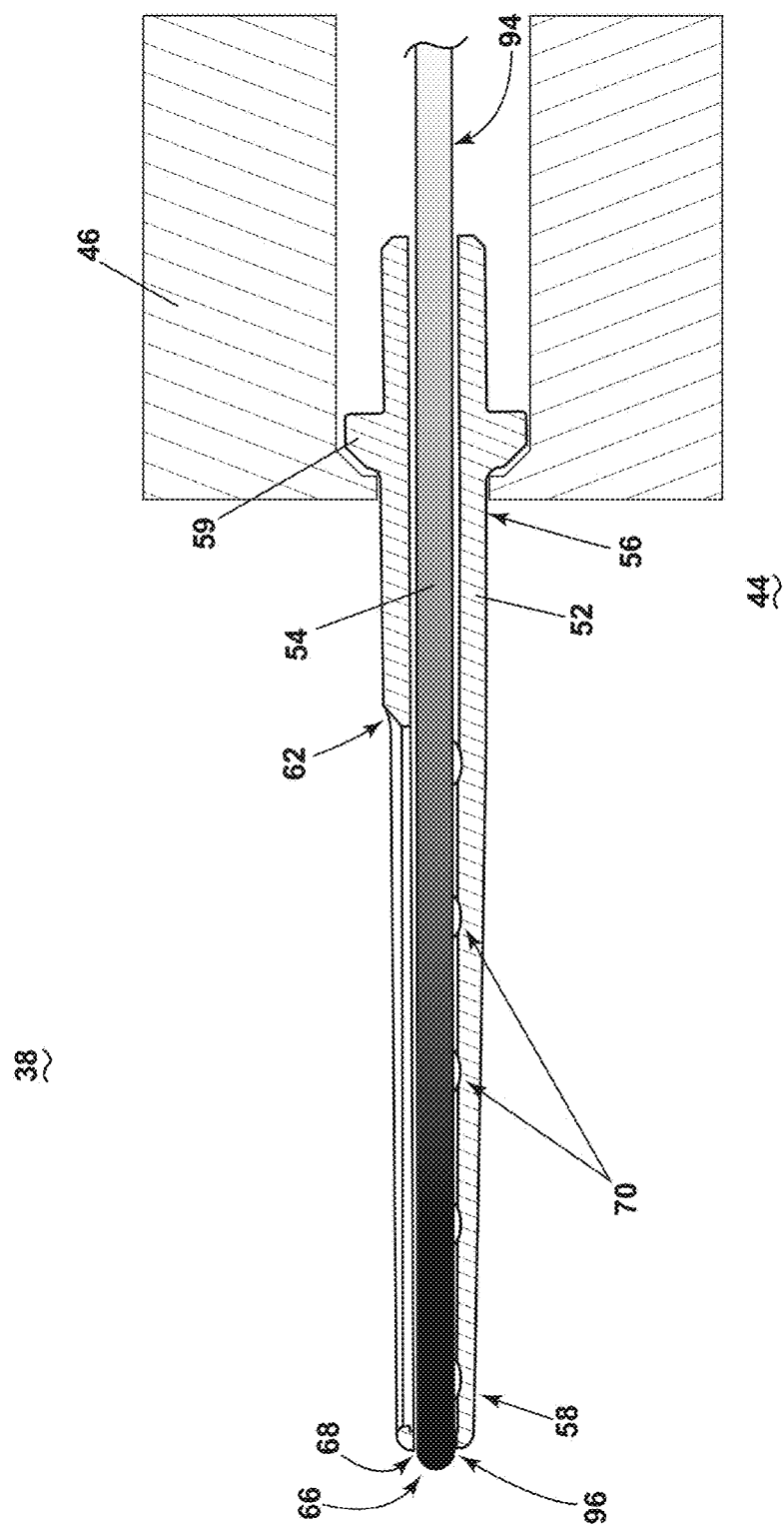
FIG. 8 illustrates an example temperature gradient of the temperature sensing probe assembly, in accordance with various aspects described herein.

FIG. 8 illustrates an example view of the temperature gradient of the temperature sensing probe 54 due to the removal of heat through or relative to the engine wall 46, previously discussed with regard to FIG. 5. As shown, a first end 94 of the temperature sensing probe 54 is shaded lighter, representing a "cooler" temperature measurement, compared with a second end 96 of the temperature sensing probe 54, shaded darker to represent a "hotter" temperature measurement, relative to the first end 94. The example illustrated is merely one non-limited view demonstrating a representative temperature gradient due to heat loss through the cooler engine wall 46 for understanding, as explained herein. Additional gradients can be included.

Many other possible aspects and configurations in addition to that shown in the above figures are contemplated by the present disclosure. Additionally, the design and placement of the various components can be rearranged such that a number of different configurations could be realized.

The aspects disclosed herein provide a temperature sensing probe assembly. One advantage that can be realized in the above aspects is that the above described aspects of the disclosure is that the temperature sensing probe assembly enables a higher airflow or a high rate of airflow through the housing to impinge the temperature sensing probe, resulting in a faster sensor response to changes in exhaust temperature. The configurations can include larger inlet openings and additional exhaust openings. Furthermore, the matching of cross-sectional areas between the inlet and exhaust openings can provide for a tailored or desired flowrate inside or through the probe assembly. A faster-responding temperature sensing probe assembly allows the engine control system to be more responsive to changes in engine operating conditions, and can increase the operating efficiency of the gas turbine engine by operating at a higher temperature or more combustion power while protecting the downstream components such as the turbine vanes and blades. A faster-responding temperature sensing probe assembly can thus operate the engine close to the thermal limits of the downstream components as the engine control system can detect and account for thermal spikes in the exhaust gas temperature more quickly, and adjust the engine operation to compensate accordingly.

Additionally, by arranging the configuration of the airflow received by or proximate to the second thermocouple junction relative to the first thermocouple junction, the difference in response time between the first and second thermocouple junctions is reduced. The reduction in difference of response time enables further confidence in faster reading of the temperature measurements. In one example configuration, the variation of the first time constants of the first and second junctions to a step change in flow path temperature is reduced to approximately 0.5%, compared with a first time constraint approximately between 15 to 16% with conventional temperature sensing probe assemblies.

Another advantage of the above-described aspects of the disclosure can include tailoring or optimizing the inlet and exhaust cross-sectional areas and locations to allow a larger mass flow of exhaust gas through the housing while maintain the structural strength required for the application, installation, or particular embodiment.

Yet another advantage of the above-described aspects of the disclosure includes spacing the second thermocouple junction farther away from the thermal gradient produced by the engine wall, or another heat-removing component. The spacing of the thermocouple junction away from the thermal gradient enables a more accurate or "true" temperature sensing compared with conventional temperature sensing probe assemblies. In one example configuration, the temperature error of the second thermocouple junction in a conventional probe assembly (error of approximately 2-5 degree Fahrenheit) can be reduced to less than 1 degree Fahrenheit using the above-described aspects, between a 55 to 82% improvement.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A temperature sensing probe assembly, comprising:
a temperature sensing probe having a tip and a first thermocouple junction located nearer the tip and a second thermocouple junction located nearer an attachment point for the temperature sensing probe assembly; and
a housing positioned around at least a portion of the temperature sensing probe and configured to operably couple to a case within an engine, and having a lengthened inlet opening that extends from at least a portion of the first thermocouple junction to at least a portion of the second thermocouple junction and having a set of exhaust openings;

wherein the tip extends beyond the housing and a stream of air flows through the housing from the lengthened inlet opening to the set of exhaust openings to establish a flow path through the housing; and wherein the case has a cooler temperature than the stream of air and wherein the configuration of the lengthened inlet opening and the set of exhaust openings shifts a thermal gradient away from the second thermocouple junction.

2. The temperature sensing probe assembly of claim 1, wherein the lengthened inlet opening extends beyond the second thermocouple junction towards the attachment point for the temperature sensing probe assembly.

3. The temperature sensing probe assembly of claim 2, wherein at least one of the set of exhaust openings is located between the second thermocouple junction and the attachment point for the temperature sensing probe assembly.

4. The temperature sensing probe assembly of claim 2, wherein the lengthened inlet opening extends beyond the first thermocouple junction towards the tip.

5. The temperature sensing probe assembly of claim 1, wherein the lengthened inlet opening is positioned along a flow axis of the stream of air.

6. The temperature sensing probe assembly of claim 5, wherein the set of exhaust openings are radially offset from the axis of the lengthened inlet opening.

7. The temperature sensing probe assembly of claim 6, wherein the set of exhaust openings are radially offset on both sides of the axis of the lengthened inlet opening.

8. The temperature sensing probe assembly of claim 7, wherein the exhaust openings offset on both sides are paired along a length of the housing.

9. The temperature sensing probe assembly of claim 7, wherein at least one of the set of exhaust openings is located between the second thermocouple junction and the attachment point for the temperature sensing probe assembly.

10. An exhaust gas temperature sensing probe assembly for use in an aircraft engine, comprising a temperature sensing probe having a tip and a first thermocouple junction located nearer the tip and a second thermocouple junction located nearer an attachment point for the temperature sensing probe assembly; and a housing positioned around at least a portion of the temperature sensing probe and configured to operably couple to a turbine case within the engine, wherein the housing has a set of inlet openings that extend from at least a portion of the first thermocouple junction to at least a portion of the second thermocouple junction and has a set of exhaust openings;

wherein a stream of heated air flows through the housing from the set of inlet openings to the set of exhaust openings to establish a flow path through the housing; and wherein the case has a cooler temperature than the stream of heated air and wherein the configuration of the set of inlet openings and the set of exhaust openings shifts a thermal gradient away from the second thermocouple junction.

11. The temperature sensing probe assembly of claim 10, wherein at least one of the set of exhaust openings is located between the second thermocouple junction and the attachment point for the temperature sensing probe assembly.

12. The exhaust gas temperature sensing probe assembly of claim 10, wherein the configuration of the set of inlet openings and the set of exhaust openings allows the stream of heated air to impinge on the temperature sensing probe closer to the attachment point.

13. The exhaust gas temperature sensing probe assembly of claim 12, wherein the set of inlet openings comprises a single lengthened inlet opening that extends beyond the second thermocouple junction towards the attachment point for the temperature sensing probe assembly.

14. The temperature sensing probe assembly of claim 13, wherein at least one of the set of exhaust openings is located between the second thermocouple junction and the attachment point for the temperature sensing probe assembly.

15. The temperature sensing probe assembly of claim 13, wherein the lengthened inlet opening is positioned along a flow axis of the stream of air.

16. The temperature sensing probe assembly of claim 15, wherein the set of exhaust openings are radially offset from the axis of the lengthened inlet opening.

17. The temperature sensing probe assembly of claim 16, wherein the set of exhaust openings are radially offset on both sides of the axis of the lengthened inlet opening.

\* \* \* \* \*